US008605216B2

(12) United States Patent
Park

(10) Patent No.: US 8,605,216 B2
(45) Date of Patent: *Dec. 10, 2013

(54) DIGITAL BROADCAST RECEIVER AND METHOD FOR PROCESSING CAPTION THEREOF

(75) Inventor: Tae Jin Park, Gyeonggi-do (KR)

(73) Assignee: LG Electronics Inc., Seoul (KR)

(*) Notice: Subject to any disclaimer, the term of this patent is extended or adjusted under 35 U.S.C. 154(b) by 144 days.

This patent is subject to a terminal disclaimer.

(21) Appl. No.: 13/227,415

(22) Filed: Sep. 7, 2011

(65) Prior Publication Data

US 2011/0317068 A1    Dec. 29, 2011

Related U.S. Application Data

(63) Continuation of application No. 13/041,305, filed on Mar. 4, 2011, now Pat. No. 8,035,742, which is a continuation of application No. 12/731,082, filed on Mar. 24, 2010, now Pat. No. 7,936,399, which is a continuation of application No. 12/428,344, filed on Apr. 22, 2009, now Pat. No. 7,714,933, which is a continuation of application No. 12/060,779, filed on Apr. 1, 2008, now Pat. No. 7,542,096, which is a continuation of application No. 10/944,389, filed on Sep. 17, 2004, now Pat. No. 7,430,016.

(30) Foreign Application Priority Data

Sep. 17, 2003  (KR) .................. P10-2003-64442

(51) Int. Cl.
 *H04N 7/08* (2006.01)
(52) U.S. Cl.
 USPC .......................................................... 348/468
(58) Field of Classification Search
 USPC ......... 348/468, 461, 465, 467, 478, 589, 600, 348/725
 See application file for complete search history.

(56) References Cited

U.S. PATENT DOCUMENTS 5,289,276 A    2/1994   Siracusa et al.
5,365,272 A    11/1994  Siracusa (Continued)

FOREIGN PATENT DOCUMENTS

CN    1145452    3/1997
CN    1171698    1/1998

(Continued)

OTHER PUBLICATIONS

Canadian Intellectual Property Office Application Serial No. 2736071, Office Action dated Apr. 30, 2013, 2 pages.

(Continued)

*Primary Examiner* — Paulos M Natnael
(74) *Attorney, Agent, or Firm* — Lee, Hong, Degerman, Kang & Waimey

(57) ABSTRACT

A digital cable broadcast receiver and a method for automatically processing caption data of various standards and types, is disclosed. The digital broadcast receiver includes: a demultiplexer for dividing a received broadcast stream into video data, audio data, supplementary information; a controller for determining whether caption data included in the video data is digital caption data or analog caption data on the basis of caption information included in the supplementary information, and outputting a control signal according to a result of the determining; a digital caption decoder for extracting and decoding digital caption data from the video data according to the control signal; and an analog caption decoder for extracting and decoding analog caption data from the video data according to the control signal.

8 Claims, 4 Drawing Sheets

(56) References Cited

U.S. PATENT DOCUMENTS

| | | |
|---|---|---|
| 5,371,547 A | 12/1994 | Siracusa et al. |
| 5,483,287 A | 1/1996 | Siracusa |
| 5,483,289 A | 1/1996 | Urade et al. |
| 5,583,577 A | 12/1996 | Tsukagoshi |
| 5,659,368 A | 8/1997 | Landis |
| 5,742,352 A | 4/1998 | Tsukagoshi |
| 5,926,613 A | 7/1999 | Schaffer |
| 5,982,448 A | 11/1999 | Reyes |
| 6,018,369 A | 1/2000 | Patterson |
| 6,040,850 A | 3/2000 | Un et al. |
| 6,256,072 B1 | 7/2001 | Bae et al. |
| 6,288,750 B1 | 9/2001 | Yamada et al. |
| 6,320,621 B1 | 11/2001 | Fu |
| 6,348,951 B1 | 2/2002 | Kim |
| 6,373,526 B1 | 4/2002 | Kessler et al. |
| 6,375,526 B2 | 4/2002 | Ikuma et al. |
| 6,381,287 B1 | 4/2002 | Shin |
| 6,393,201 B1 | 5/2002 | Sakuramoto et al. |
| 6,507,369 B1 | 1/2003 | Kim |
| 6,529,526 B1 | 3/2003 | Schneidewend |
| 6,707,504 B2 * | 3/2004 | Chung .................. 348/569 |
| 6,829,429 B1 | 12/2004 | Kitahashi et al. |
| 6,912,013 B2 | 6/2005 | Katayama et al. |
| 6,977,690 B2 | 12/2005 | Gomikawa |
| 7,019,787 B2 | 3/2006 | Park |
| 7,071,993 B2 | 7/2006 | Kim |
| 7,139,031 B1 | 11/2006 | Bray |
| 7,161,631 B2 | 1/2007 | Katayama et al. |
| 7,184,095 B2 | 2/2007 | Katayama |
| 7,266,289 B2 | 9/2007 | Kimura et al. |
| 7,349,429 B2 | 3/2008 | Lee et al. |
| 7,391,470 B2 | 6/2008 | Kim |
| 7,430,016 B2 * | 9/2008 | Park ...................... 348/468 |
| 7,450,177 B2 | 11/2008 | Lee et al. |
| 7,502,072 B2 | 3/2009 | Onomatsu et al. |
| 7,511,761 B2 | 3/2009 | Lynch |
| 7,522,215 B2 * | 4/2009 | Park ...................... 348/468 |
| 7,542,096 B2 * | 6/2009 | Park ...................... 348/468 |
| 7,548,565 B2 | 6/2009 | Sull et al. |
| 7,663,696 B2 | 2/2010 | Modi et al. |
| 7,692,722 B2 | 4/2010 | Kim |
| 7,701,511 B2 | 4/2010 | Kurose et al. |
| 7,714,933 B2 * | 5/2010 | Park ...................... 348/468 |
| 7,719,615 B2 * | 5/2010 | Park ...................... 348/468 |
| 7,852,407 B2 | 12/2010 | Park |
| 7,877,769 B2 | 1/2011 | Corl |
| 7,877,773 B2 | 1/2011 | Corl |
| 7,917,926 B2 | 3/2011 | Corl |
| 7,936,399 B2 * | 5/2011 | Park ...................... 348/468 |
| 8,004,608 B2 | 8/2011 | Lee |
| 8,035,742 B2 * | 10/2011 | Park ...................... 348/468 |
| 8,286,207 B1 | 10/2012 | Schneidewend et al. |
| 8,316,401 B2 | 11/2012 | Kim et al. |
| 8,330,864 B2 | 12/2012 | Blumenschein et al. |
| 8,422,563 B2 | 4/2013 | Bhat et al. |
| 8,477,244 B2 | 7/2013 | Park |
| 2001/0009445 A1 | 7/2001 | Chung |
| 2002/0035726 A1 | 3/2002 | Corl |
| 2002/0067428 A1 * | 6/2002 | Thomsen ................ 348/465 |
| 2002/0122136 A1 | 9/2002 | Safadi et al. |
| 2002/0140863 A1 | 10/2002 | Park |
| 2002/0154891 A1 | 10/2002 | Kimura et al. |
| 2003/0007096 A1 | 1/2003 | Katayama et al. |
| 2003/0101448 A1 | 5/2003 | Kim |
| 2003/0142959 A1 | 7/2003 | Qu |
| 2004/0017831 A1 | 1/2004 | Shen et al. |
| 2004/0036801 A1 | 2/2004 | Katayama et al. |
| 2004/0036806 A1 | 2/2004 | Katayama |
| 2004/0237123 A1 | 11/2004 | Park |
| 2005/0012858 A1 | 1/2005 | Kim |
| 2005/0046515 A1 | 3/2005 | Wang et al. |
| 2005/0162551 A1 | 7/2005 | Baker |
| 2006/0064716 A1 * | 3/2006 | Sull et al. ............... 725/37 |
| 2006/0098641 A1 | 5/2006 | Lee et al. |
| 2007/0097262 A1 * | 5/2007 | Kwon et al. ........... 348/465 |
| 2008/0266453 A1 | 10/2008 | Fisher |
| 2010/0020234 A1 | 1/2010 | Smith et al. |
| 2010/0177243 A1 | 7/2010 | Park |
| 2010/0225808 A1 | 9/2010 | Mears |
| 2010/0283898 A1 | 11/2010 | Mears |
| 2013/0067520 A1 | 3/2013 | Corl |

FOREIGN PATENT DOCUMENTS

| | | |
|---|---|---|
| CN | 1429020 | 7/2003 |
| JP | 2003018490 | 1/2003 |
| KR | 2019960026178 | 7/1996 |
| KR | 1020000074839 | 12/2000 |
| KR | 1020010036876 | 5/2001 |
| KR | 1020010036897 | 5/2001 |

OTHER PUBLICATIONS

United States Patent and Trademark Office U.S. Appl. No. 13/860,512, Office Action dated Jul. 17, 2013, 7 pages.

United States Patent and Trademark Office U.S. Appl. No. 13/620,599, Office Action dated Jul. 18, 2013, 9 pages.

United States Patent and Trademark Office U.S. Appl. No. 13/403,916, Office Action dated Jul. 31, 2013, 11 pages.

United States Patent and Trademark Office U.S. Appl. No. 13/405,145, Office Action dated Jul. 31, 2013, 8 pages.

United States Patent and Trademark Office U.S. Appl. No. 13/862,315, Office Action dated Jul. 31, 2013, 8 pages.

United States Patent and Trademark Office U.S. Appl. No. 13/862,344, Office Action dated Aug. 15, 2013, 9 pages.

United States Patent and Trademark Office U.S. Appl. No. 13/943,641, Office Action dated Sep. 10, 2013, 8 pages.

United States Patent and Trademark Office U.S. Appl. No. 13/944,737, Office Action dated Sep. 18, 2013, 10 pages.

United States Patent and Trademark Office U.S. Appl. No. 13/944,780, Office Action dated Oct. 2, 2013, 13 pages.

* cited by examiner

FIG. 2

| Syntax | No. of Bits | Format |
|---|---|---|
| caption_service_descriptor(){ | | |
|   descriptor_tag | 8 | 0x86 |
|   descriptor_length | 8 | uimsbf |
|   reserved | 3 | '111' |
|   number_of_service | 5 | uimsbf |
|   for(i=0;i<number_of_service;i++){ | | |
|     language | 8*3 | uimsbf |
|     cc_type | 1 | bslbf |
|     if(cc_type==0) { | | |
|       analog_cc_type | 1 | bslbf |
|       if(analog_cc_type==0) | | |
|         line_offset | 5 | |
|       else | | |
|         reserved | 5 | uimsbf |
|         line field | 1 | bslbf |
|     } | | |
|     else { | | |
|       reserved | 1 | '1' |
|       caption_service_number | 6 | uimsbf |
|     } | | |
|     easy_reader | 1 | bslbf |
|     wide-aspect_ratio | 1 | bslbf |
|     reserved | 14 | '11111111111111' |
|   } | | |
| } | | |

DIGITAL BROADCAST RECEIVER AND METHOD FOR PROCESSING CAPTION THEREOF

CROSS REFERENCE TO RELATED APPLICATIONS

This application is a continuation of U.S. application Ser. No. 13/041,305 filed Mar. 4, 2011, now U.S. Pat. No. 8,035,742, which is a continuation of U.S. application Ser. No. 12/731,082 filed Mar. 24, 2010, now U.S. Pat. No. 7,936,399, which is a continuation of U.S. application Ser. No. 12/428,344 filed Apr. 22, 2009, now U.S. Pat. No. 7,714,933, which is a continuation of U.S. application Ser. No. 12/060,779 filed Apr. 1, 2008, now U.S. Pat. No. 7,542,096, which is a continuation of U.S. application Ser. No. 10/944,389 filed on Sep. 17, 2004, now U.S. Pat. No. 7,430,016, which claims the benefit of earlier filing date and right of priority to Korean Application No. P2003-064442 filed on Sep. 17, 2003, the contents of which are all hereby incorporated by reference herein in their entirety.

BACKGROUND OF THE INVENTION

1. Field of the Invention

The present invention relates to a digital cable broadcast receiver, and more particularly, to a digital cable broadcast receiver and a method for processing a caption thereof that can process a caption of a various types and standards for use in a digital cable broadcast, in an adaptive manner.

2. Discussion of the Related Art

A ground wave broadcast standard for an analog broadcast in USA (United States of America) is an NTSC (national television system committee) standard. The NTSC standard is characterized in transmitting a closed caption such as English, Spanish, using a $21^{st}$ line of a VBI (vertical blanking interval) of a broadcast signal. A standard related to the transmission of the closed caption is an EIA (electronic industry association) standard 608. Services provided through a $21^{st}$ line of the VBI under the EIA 608 standard are as follows: CC1 (primary synchronous caption service), CC2 (special asynchronous caption service), CC3 (secondary synchronous caption service), CC4 (special asynchronous caption service), Text1 (first letter information service), Text2 (second letter information service), Text3 (third letter information service), Text4 (fourth letter information service).

In USA, a user has to select, in person, one among the above-mentioned services. Further, since there is no information as to which service is provided among the above-mentioned eight services while a broadcast program is displayed, there has been a difficulty that a user should check, case by case, the services so as to check a service under execution.

A ground wave broadcast standard for a digital broadcast in USA is an ATSC (advanced television system committee) standard. Further, an EIA 708, which is a standard on a digital TV closed caption (DTVCC), is established. The DTVCC will be described with reference to the accompanying drawings. FIG. 1 illustrates the general bit stream provided to a digital TV. As shown in FIG. 1, the bit stream includes: audio data, video data, control data (i.e., supplementary information). Data that corresponds to the DTVCC is included in user_data bits of the video data and transmitted under an MPEG-2 (Moving Picture Experts Group-2) video standard and the ATSC standard (A53). At this point, according to the above standards, the DTVCC data can be transmitted up to as much as 128 bytes at its maximum for each user_data region and the total transmission amount cannot exceed 9600 bps (bit per second). Compared with an analog closed caption based on the EIA 608, where the total transmission amount cannot exceed 960 bps, the DTVCC based on the EIA 708 has realized ten times greater bandwidth in its data transmission. The DTVCC based on the EIA 708 can provide sixty-three caption services in total with consideration of the extended bandwidth. In case of the sixty-three digital caption services, there is a difficulty that a user should change settings to find out a desired caption service as was done in the above-described analog closed caption. Due to such reason, in case of providing a DTVCC according to the ATSC standard, a broadcast station must include information called a caption_service_descriptor within an EIT (event information table) or a PMT (program map table) in a PSIP (program and system information protocol). The EIT and the caption_service_descriptor allow a DTV receiver to know what kind of the DTVCC is included in a relevant program.

The cable broadcast is a little different from the ground wave broadcast depending on regions, or service companies, or broadcast equipments. In particular, the cable broadcast is the same as the ground wave analog broadcast in that transmission is performed on the basis of a letter value and a command set prescribed by the EIA 608 in operating a closed caption. However, the cable broadcast is different from the ground wave broadcast in transmitting the closed caption using other interval of the VBI except a $21^{st}$ line of the VBI. That is, some broadcast station transmits a caption using a sixth line of the VBI while other broadcast station transmits a caption using a tenth line. In the meantime, as an analog cable broadcast is switched into a digital cable broadcast, a closed caption standard regarding the digital broadcast has been established independently. The basic object of standards tilted SCTE (society of cable television engineers) 20 and DVS (digital video surveillance) 157 is to convert an analog closed caption for use in the analog cable broadcast into user_data within a video data region for use in a digital TV. Those standards do not include content regarding a DTVCC of the EIA 708 standard but only prescribe content regarding the analog closed caption as is done in the existing standards.

The ATSC standard regarding the DTVCC does not consider the closed caption under the SCTE 20 or the DVS 157 which are caption transmission standards for use in the cable broadcast. Since a cable broadcast service company has provided a cable set top box appropriate for the company's broadcast to each user, there was little problem in a digital-cable-broadcast generation before an open-cable generation. However, under a new digital broadcast environment such as an open cable and a Cable Ready, there occur problems regarding the standards. That is, under the open cable and the Cable Ready environments whose object is to connect an apparatus generally available in the market, not a specific cable broadcast receiver provided by a specific cable broadcast company, to a cable, a method for transmitting/receiving a caption emerges as a very complicated problem.

An open cable broadcast signal under regulations of a FCC (federal communications commission) must include a DTVCC and an analog CC (closed caption) prescribed by the EIA 708. Further, the open cable broadcast signal should include user_ data of other type prescribed by the SCTE 20 or the DVS 157 and may include a relevant caption at a S-Video, a Composite, a 480i, and a VBI line of the Component output. Therefore, the cable broadcast receiver should know what kind of caption data is included in a digital cable broadcast being received. However, it is difficult for the cable broadcast receiver to judge a kind of caption data being received in view of characteristics of caption data. Accordingly, a user should check in person the caption data through a key or a menu on a remote control. Also, a user should experimentally select and check what kind of caption data is decoded.

SUMMARY OF THE INVENTION

Accordingly, the present invention is directed to a digital cable broadcast receiver and a method for processing a caption thereof that substantially obviate one or more problems due to limitations and disadvantages of the related art.

An object of the present invention is to provide a digital cable broadcast receiver and a method for processing a caption thereof that can automatically process caption data of various standards and types.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a digital cable broadcast receiver including: a demultiplexer for dividing a received broadcast stream into video data, audio data, supplementary information; a controller for judging whether caption data included in the video data is digital caption data or analog caption data on the basis of caption information included in the supplementary information, and outputting a control signal according to a result of the judgment; a digital caption decoder for extracting and decoding digital caption data from the video data according to the control signal; and an analog caption decoder for extracting and decoding analog caption data from the video data according to the control signal.

The controller judges a number of caption services, a national language, a difficulty level of a caption, a line number and a field of a VBI that corresponds to the caption data, a picture ratio, provided by the caption data included in the video data, on the basis of the caption information.

If the caption data included in the video data is digital caption data, the controller detects a caption service number that corresponds to the caption data from the caption information and transmits the control signal including the detected caption service number to the digital caption decoder.

If the caption data included in the video data is analog caption data, the controller judges the caption data's standard on the basis of the caption information. If the caption data is an analog caption data of an EIA 708, the controller detects field information that corresponds to the caption data from the caption information, and transmits the control signal including the detected field information to the analog caption decoder, and if the caption data is an analog caption data of the SCTE 20 or the DVS 157 standards, the controller detects field information and VBI line information that correspond to the caption data and transmits the control signal including the detected field information and the VBI line information, to the analog caption decoder.

In another aspect of the present invention, a digital broadcast receiver further includes: a program map table (PMT) buffer for storing a PMT included in the supplementary information and transmitting the stored PMT to the controller; an event information table (EIT) buffer for storing an EIT included in the supplementary information and transmitting the stored EIT to the controller; and a graphic block for receiving characteristic information of the caption data detected from the supplementary information, from the controller and displaying characteristics of the caption data on a screen.

In still another aspect of the present invention, a method for processing caption includes the steps of: dividing a received broadcast stream into video data, audio data, and supplementary information; judging whether caption data included in the video data is digital caption data or analog caption data on the basis of caption information included in the supplementary information; and selectively detecting at least one of parameters included in the caption information according to a result of the judgment; and extracting and decoding the caption data included in the video data on the basis of the detected parameter.

The step of selectively detecting at least one of parameters included in the caption information according to the result of the judgment, includes the step of: if the caption data included in the video data is digital caption data, detecting a caption service number that corresponds to the caption data from the caption information.

The step of selectively detecting at least one of parameters included in the caption information according to the result of the judgment, includes the step of: if the caption data included in the video data is analog caption data, detecting a standard of the caption data on the basis of the caption information; and detecting at least one of parameters included in the caption information according to the detected standard. At this point, if the detected standard of the caption data is the EIA 708, a field value that corresponds to the caption data is detected from the caption information and if the detected standard of the caption data is the SCTE 20 or the DVS 157, a field value and a VBI line number that correspond to the caption data are detected from the caption information.

The method for processing caption further includes the steps of: detecting characteristics of the caption data included in the video data on the basis of the caption information; and displaying the detected characteristics on a screen.

The characteristics of the caption data includes at least one among a number of caption services, a national language of a caption, a difficulty level of a caption, a picture ratio of a caption, a field value and a VBI line number that correspond to the caption data, provided by the caption data.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 2 is a view illustrating a syntax of caption information according to the present invention;

DETAILED DESCRIPTION OF THE INVENTION

Figure 1:
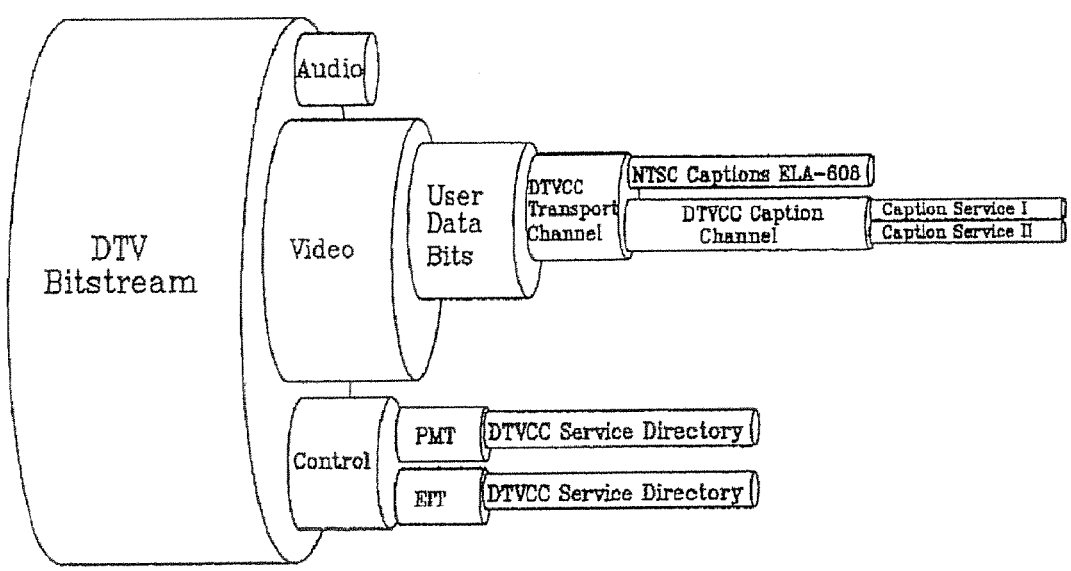
FIG. 1 is a view illustrating a bit stream of the general digital broadcast.

Reference will now be made in detail to the preferred embodiments of the present invention, examples of which are illustrated in the accompanying drawings.

A digital cable broadcast under an open cable and a Cable Ready standards observes an ATSC standard. Therefore, the caption_service_descriptor the EIT or the PMT within the PSIP, included in the digital cable broadcast signal is prescribed by the ATSC standard (A65, Program and System Information Protocol for Terrestrial Broadcast and Cable).

FIG. 2 is a view showing a syntax of the caption_service_descriptor under the open cable and the Cable Ready standards according to the present invention. "descriptor_tag", which is a parameter for checking a type of a descriptor, is described by 8 bits. "descriptor_length", which is a parameter representing a length of the whole structure, is described by 8 bits. "number_of_services" represents a number of provided caption services and is described by 5 bits. "language" represents language information of a relevant caption, such as English for a service 1 and Spanish for a service 2, and is a 3-byte language code under ISO 639.2/B, each letter of which is coded with 8 bits and inserted into a 24-bit field. "cc_type" represents a kind of caption. If cc_type==1, it is a digital caption (advanced caption) and if cc_type==0, it is an analog caption (analog caption under the EIA 708 or the SCTE 20 (DVS 157)). The "cc_type" is described by 1 bit. "analog_cc_type" represents a kind of an analog caption. If analog_cc_type==1, it means caption data transmitted through a line 21 of the VBI under the EIA 708, and if analog_cc_type==0, it means caption data transmitted through other line except the line 21 of the VBI according to the SCTE 20 or the DVS 157. "line_offset" represents a number of the VBI line including the caption data in case caption data under the SCTE 20 or the DVS 157 is transmitted, namely, in case the analog_cc_type==0, and is described by 5 bits. "line_field" represents whether the caption data is included in an even field or an odd field. That is, if line_field==0, it means the caption data is included in an odd field and if line_field==1, it means the caption data is included in an even field. "caption_service_number" represents 1-63 caption service numbers in case it is a digital caption, namely, in case cc_type==1. and is described by 6 bits. "easy_reader" is a flag representing whether it is a caption easily read by a user or not. "wide_aspect_ratio" is related to a screen ratio, and more particularly, is a flag representing whether a received caption data is intended for a 16:9 screen or not.

If cc_type==0, a received caption is an analog caption. As described above, for the analog caption, there exist an analog caption under the EIA 708 standard, and an analog caption under the SCTE 20 or the DVS 157 standard. However, since the analog caption under the EIA 608 standard is a pure analog caption, not a closed caption for a digital TV mentioned in the present invention, the analog caption under the EIA 608 standard is excluded. Therefore, an analog caption for the case cc_type==0, is either an analog caption under the EIA 708 standard or an analog caption under the SCTE 20 or the DVS 157 standard.

"analog_cc_type" represents whether a received caption is an analog caption under the EIA 708 standard or an analog caption under the SCTE 20 or the DVS 157 standard. If analog_cc_type==0, it means that the relevant caption is included in a video data region in form of user data under the SCTE 20 or the DVS 157, which are standards on the digital cable broadcast. In that case, since to which line of the VBI the received caption is assigned, is not known in view of characteristics of the cable broadcast, the line_offset describes to which line of the VBI the received caption is included. If analog_cc_type==1, it means that an analog caption under the EIA 708 standard is included in a video data region in form of user data. In that case, since the caption is assigned to a $21^{st}$ line of the VBI, a line_offset value is not required. Therefore, 5 bits assigned to the line_offset becomes a reserved bit and 1 bit is assigned to the line_field representing whether a caption is a caption included in an even field or a caption included in an odd field. If line_field==0, it means a caption is included in an odd field and if line_field==1, it means a caption is included in an even field.

As described above, whether a caption included in the digital cable broadcast is an analog caption or a digital caption is judged on the basis of information included in the caption_service_descriptor. Further, if the received caption is an analog caption, whether the caption is an analog caption under the EIA 708 standard or a caption for a cable broadcast under the SCTE 20 or the DVS 157 standard, is judged. If the received caption is a caption under the SCTE 20 or the DVS 157 standard, in which line of the VBI the caption data is included, is judged. If the received caption is a digital caption, information as to which service the caption includes among sixty-three services, is checked.

A broadcast station generates caption information including the above described various information and adds the caption information to a broadcast signal. A broadcast receiver detects caption information included in a broadcast signal provided from the broadcast station, and judges various characteristics of the received caption data on the basis of parameter values included in the detected caption information.

Figure 3:
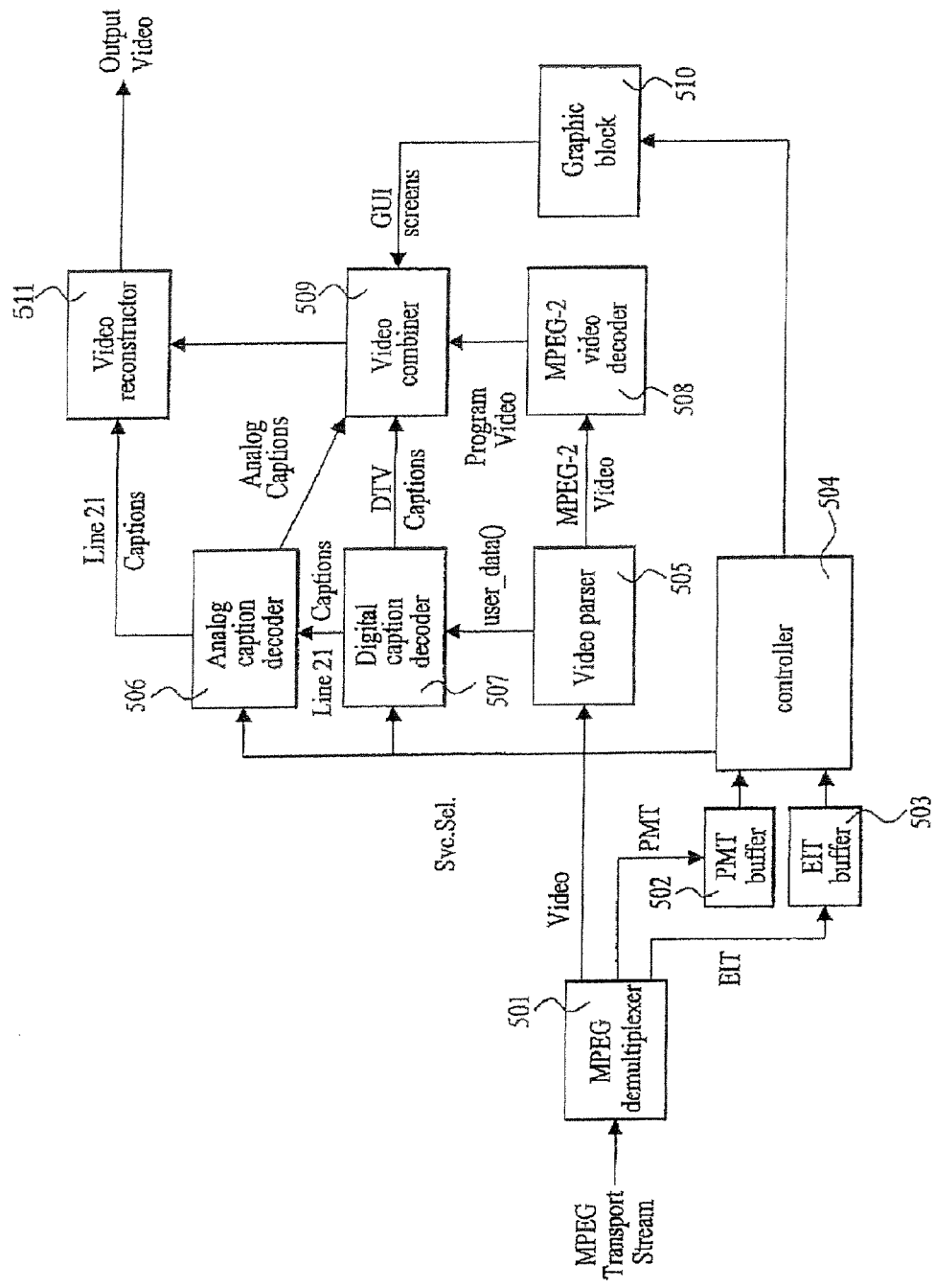
FIG. 3 is a block diagram illustrating a construction of a broadcast receiver according to the present invention.

FIG. 3 is a block diagram illustrating a construction of a digital broadcast receiver according to the present invention. Referring to FIG. 3, a MPEG demultiplexer 501 receives a MPEG-2 transport stream from a cable and decodes the transport stream so as to extract video data, audio data, and supplementary information. Further, the MPEG demultiplexer 501 detects an EIT and a PMT included in the supplementary information. The detected PMT is stored in a PMT buffer 502 and the detected EIT is stored in an EIT buffer 503. Here, the detected PMT or EIT includes caption information, namely, a caption_service_descriptor. A controller 504 receives caption information from the PMT buffer 502 or the EIT buffer 503 and detects caption data included in the transport stream on the basis of the caption information. A video parser 505 receives video data decoded by the demultiplexer 501 and separates the video data into user_data and MPEG-2 video data. An analog caption decoder 506 receives user_data from the video parser 505 and detects analog caption data from the user_data on the basis of a signal outputted from the controller 504. A digital caption decoder 507 receives the user_data from the video parser 505 and detects digital caption data from the user_data on the basis of a signal outputted from the controller 504. A MPEG-2 video decoder 508 decodes MPEG-2 video data generated by the video parser 505. A graphic block 510 outputs a signal for generating a GUI (graphic user interface) such as an OSD (on screen display) menu including information provided from the controller 504. The graphic block 510 displays, on a screen, various characteristics of the received caption data, for example, a number of caption services, a national language of a caption, a type and a standard of the received caption data, VBI line information and field information that correspond to the caption data, a difficulty level of the caption, a picture ratio of the caption. A video combiner 509 receives analog caption data from the analog caption decoder 506 or receives digital caption data from the digital caption decoder 507. Further, the video combiner 509 receives video data from the MPEG-2 video decoder 508 and receives a signal outputted from the graphic block 510. The video combiner 509 combines the received signals so as to generate data that will be possibly displayed. A video reconstructor 511 encodes an analog caption data decoded by the analog caption decoder 506, at a $21^{st}$ line of the VBI.

Figure 4:
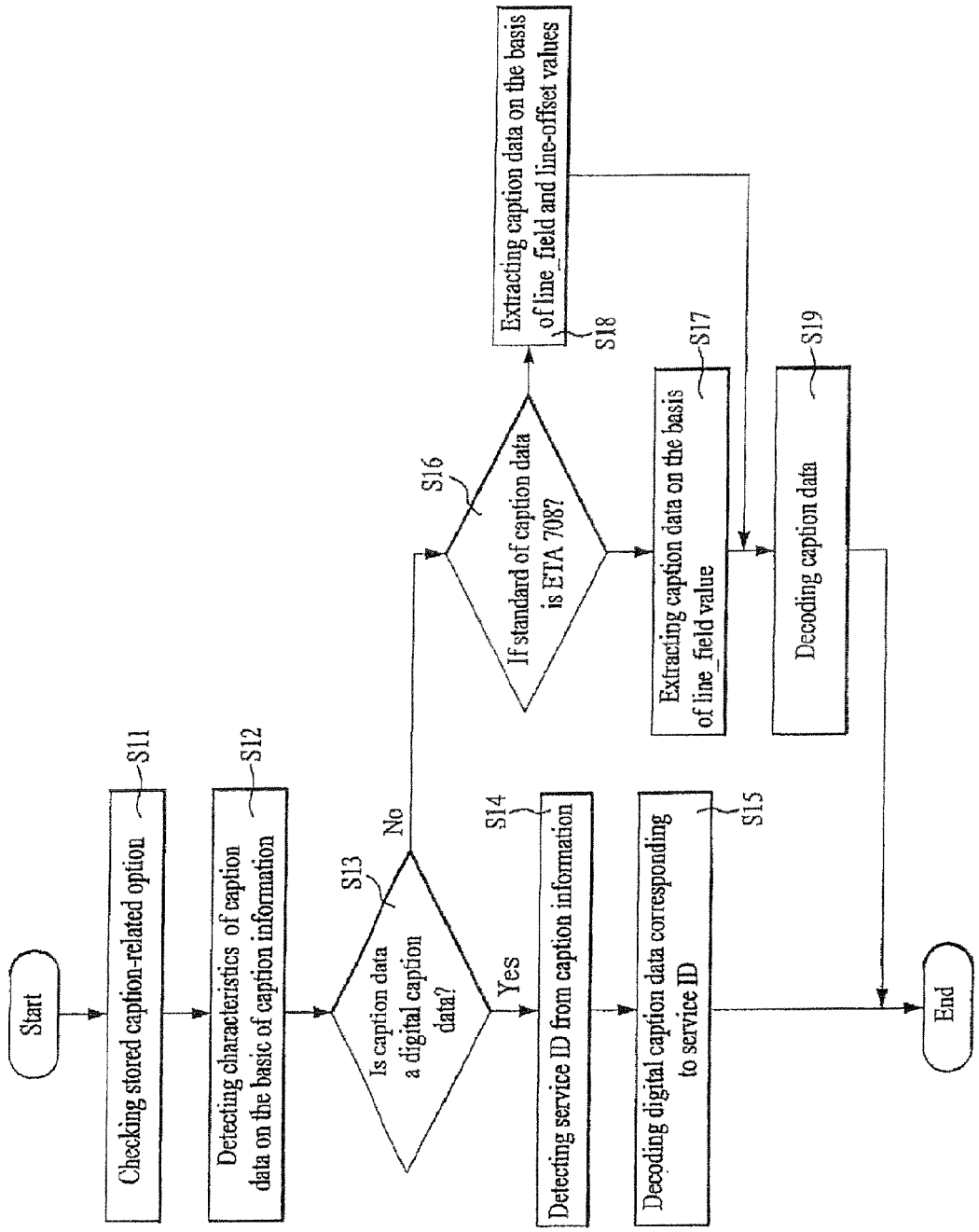
FIG. 4 is a flowchart illustrating a method for processing a caption according to the present invention.

Operation of the digital broadcast receiver as described above according to the present invention will now be described. FIG. 4 illustrates a method for processing a caption according to the present invention.

If a MPEG-2 transport stream transmitted through a cable is received, the MPEG demultiplexer 501 divides the received transport stream into video data, and audio data, supplementary information. The supplementary information includes a PSIP defining electronic program guide (EPG) and system information (SI). The PSIP includes a plurality of tables including information for transmitting/receiving A/V (audio/video) data made in a MPEG-2 video and AC-3 (audio coding-3) audio formats, and information regarding channels of each broadcast station and information regarding each program of channel. Among them, information regarding the PMT and information regarding the EIT are stored in the PMT buffer 502 and the EIT buffer 503, respectively. Under the ATSC standard, the digital cable broadcast signal must include a caption_service_descriptor in its PMT or EIT.

The controller 504 reads a caption-related option stored in a memory (not shown) and determines a caption-related option selected by a user (S11). For example, the caption-related option includes various options such as "caption off", "caption service selection (cc1, cc2, cc3, . . . )", "English caption display", "Korean caption display", "size of caption", "color of caption". If a user selects "caption off", the controller 504 does not display the received caption. If a user selects "English caption display", the controller 504 controls the caption decoders 506 and 507 so that only the caption written in English may be displayed on a screen. Further, the controller 504 controls the caption decoders 506 and 507 so that the received caption data may be processed according to a set size and a set color of a caption.

The controller 504 receives the caption information and judges characteristics of the received caption data on the basis of parameter values included in the caption information (S12). The controller 504 judges a number of caption services on the basis of the caption information. For example, the controller 504 judges whether a synchronous caption, an asynchronous caption service, a letter information service are provided. The controller 504 judges a language of the received caption on the basis of the caption information. For example, the controller 504 judges whether the received caption is English, Japanese, or Korean. The controller 504 judges a type of the received caption data on the basis of the caption information. For example, the controller 504 judges whether the received caption data is digital caption data or analog caption data (S13). The controller 504 determines a standard of the received caption data on the basis of the caption information. For example, if the received caption data is analog caption data, the controller 504 judges whether the received caption data is caption data under the EIA 708 standard or the SCTE 20 or the DVS 157 standard. Further, the controller 504 judges a VBI line number and a field including the received caption, a difficulty level of the received caption, and a picture ratio of the received caption on the basis of the caption information.

To judge whether the received caption data is digital caption data in the step of S13, the controller 504 judges whether the digital caption data is included in the video data on the basis of the caption information.

If digital caption data under the EIA 708 is included in the video data (if cc_type==1), the controller 504 detects a service ID that corresponds to the caption data from the caption information (S14) and transmits the detected service ID to the digital caption decoder 507. The service ID can be known from a capto_service_number included in the caption information. The digital caption decoder 507 extracts and decodes caption data that corresponds to the service ID from user_data of a picture header transmitted from the video parser 505 (S15). Subsequently, the extracted caption data is transmitted to the video combiner 509. The video combiner 509 combines the extracted caption data, video data outputted from the MPEG-2 video decoder 508, and signals outputted from the graphic block 510.

If analog caption data is included in the video data (if cc_type==0), the controller 504 judges whether the received caption data is analog caption data (analog_cc_type=1) under the EIA 708 standard or analog caption data (analog_cc_type==0) under the SCTE 20 or DVS 157 standard (S16). At this point, the controller 504 determines a standard of the received analog caption data on the basis of the caption information.

If the received caption data is analog caption data under the SCTE 20 or the DVS 157, the controller 504 checks VBI line information described in 5 bits by a line_offset included in the caption information. The VBI line information represents a position of the caption data. Further, the controller 504 judges a field where the caption data exists on the basis of line_field information included in the caption information. If line_field==0, the caption data exists in an odd field and if line_field==1, the caption data exists in an even field. After that, the controller 504 transmits the above checked VBI line information and the line field information to the analog caption decoder 506. If the received caption data is analog caption data, user_data outputted from the video parser 505 is not processed by the digital caption decoder 507. The analog caption decoder 506 finds out (S18) analog caption data made in the SCTE 20 or the DVS 157 standard from user_data inputted from the video parser 505 on the basis of the VBI line information and the line field information, and decodes the analog caption data (S19). The analog caption data found by the analog caption decoder 506 is transmitted to the video combiner 509. The video combiner 509 combines the analog caption data, video data outputted from the MPEG-2 video decoder 508, and signals outputted from the graphic block 510. Signals outputted from the video combiner 509 are transmitted to the video reconstructor 511. The video reconstructor 511 reconstructs a caption by encoding analog caption data outputted from the analog caption decoder 506, at a VBI $21^{st}$ line. The reconstruction of a caption is to prevent analog caption data from being an open caption in case of storing data, as it is, outputted from the video combiner 509 in a storage medium such as a VCR (video cassette recorder).

If the received caption data is analog caption data under the EIA 708 standard (if analog_cc_type==1), the controller 504 transmits line_field information included in the caption information to the analog caption decoder 506. Since analog caption data under the EIA 708 standard is positioned at a VBI $21^{st}$ line, a line_offset value is not required. At this point, the digital caption decoder 507 extracts a 2-byte analog data in user_data including digital caption data from the video parser 505 and transmits the analog data to the analog caption decoder 506. Subsequently, the analog caption decoder 506 finds out (S17) analog caption data present in a VBI $21^{st}$ line from the 2-byte analog data on the basis of the line_field information and decodes the analog caption data (S19). The found analog caption data is combined with video data from the MPEG-2 video decoder 508 and signals from the graphic block 510 by the video combiner 509. The video reconstructor 511 reconstructs a caption by encoding analog caption data from the analog caption decoder 506 at a VBI $21^{st}$ line.

If analog caption data under the EIA 708 and analog caption data under the SCTE 20 and the DVS 157 are all present in the user_data, the analog caption data under the EIA 708 is processed. Further, if digital caption data under the EIA 708 and analog caption data under the EIA 708 are all present in the user_data, the digital caption data is processed.

As described above, the present invention judges a type of caption data on the basis of caption information included in the received broadcast signal and automatically processes the caption data according to the type, thereby providing convenience to a user. Further, the present invention judges various characteristics of the received caption data such as a standard of caption data, a number of caption services being received and provides the characteristics to a user. Furthermore, the present invention can store caption-related options selected by a user and display the caption being received according to the caption-related options.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A method for processing a digital broadcast signal, the method comprising:
    demultiplexing a digital television (DTV) stream into a video stream, an audio stream, and a supplementary information stream,
    wherein the video stream includes user data bits, the user data bits carrying a digital television closed caption (DTVCC) transport channel including a DTVCC caption channel in which caption service data for providing at least one closed caption service is carried,
    wherein the supplementary information stream includes a program mapping table (PMT) and an event information table (EIT),
    wherein the PMT or EIT includes a caption service descriptor that comprises a caption information field indicating whether a DTVCC service or a line 21 closed caption service is present in the video stream in accordance with electronic industry association (EIA) 708, and
    wherein the caption information field is set when the DTVCC service is present and the caption information field is not set when the line 21 closed caption service is present in accordance with EIA 708;
    detecting caption information from the EIT or PMT;
    determining whether caption data in the video stream is analog caption data or digital caption data;
    decoding the caption data in the video stream; and
    decoding video data in the video stream.

2. The method of claim 1, wherein decoding the caption data comprises decoding the caption data corresponding to a service identifier in the user data bits of a picture header of the video stream.

3. The method of claim 1, wherein the caption service descriptor is a descriptor located in a descriptor( ) field of the EIT.

4. The method of claim 1, wherein the caption service descriptor further comprises a field indicating a number of closed caption services present in an associated EIT event.

5. A receiver for processing a digital broadcast signal, the receiver comprising:
    a demultiplexer configured to demultiplex a digital television (DTV) stream into a video stream, an audio stream, and a supplementary information stream,
    wherein the video stream includes user data bits, the user data bits carrying a digital television closed caption (DTVCC) transport channel including a DTVCC caption channel in which caption service data for providing at least one closed caption service is carried,
    wherein the supplementary information stream includes a program mapping table (PMT) and an event information table (EIT),
    wherein the PMT or EIT includes a caption service descriptor that comprises a caption information field indicating whether a DTVCC service or a line 21 closed caption service is present in the video stream in accordance with electronic industry association (EIA) 708, and
    wherein the caption information field is set when the DTVCC service is present and the caption information field is not set when the line 21 closed caption service is present in accordance with EIA 708;
    a controller configured to:
        detect caption information from the EIT or PMT, and
        determine whether caption data in the video stream is analog caption data or digital caption data;
    a caption decoder configured to decode the caption data in the video stream; and
    a video decoder configured to decode video data in the video stream.

6. The receiver of claim 5, wherein the caption decoder is further configured to decode the caption data corresponding to a service identifier in the user data bits of a picture header of the video stream.

7. The receiver of claim 5, wherein the caption service descriptor is a descriptor located in a descriptor( ) field of the EIT.

8. The receiver of claim 5, wherein the caption service descriptor further comprises a field indicating a number of closed caption services present in an associated EIT event.

* * * * *